May 18, 1948.　　　J. A. LACLAIR　　　2,441,638
WHEEL SUPPORT
Filed April 30, 1946　　　2 Sheets-Sheet 1

Inventor
Joseph A. LaClair.

Clarence A. O'Brien
and Harvey B. Jacobson
Attorneys

May 18, 1948.  J. A. LACLAIR  2,441,638
WHEEL SUPPORT
Filed April 30, 1946   2 Sheets-Sheet 2
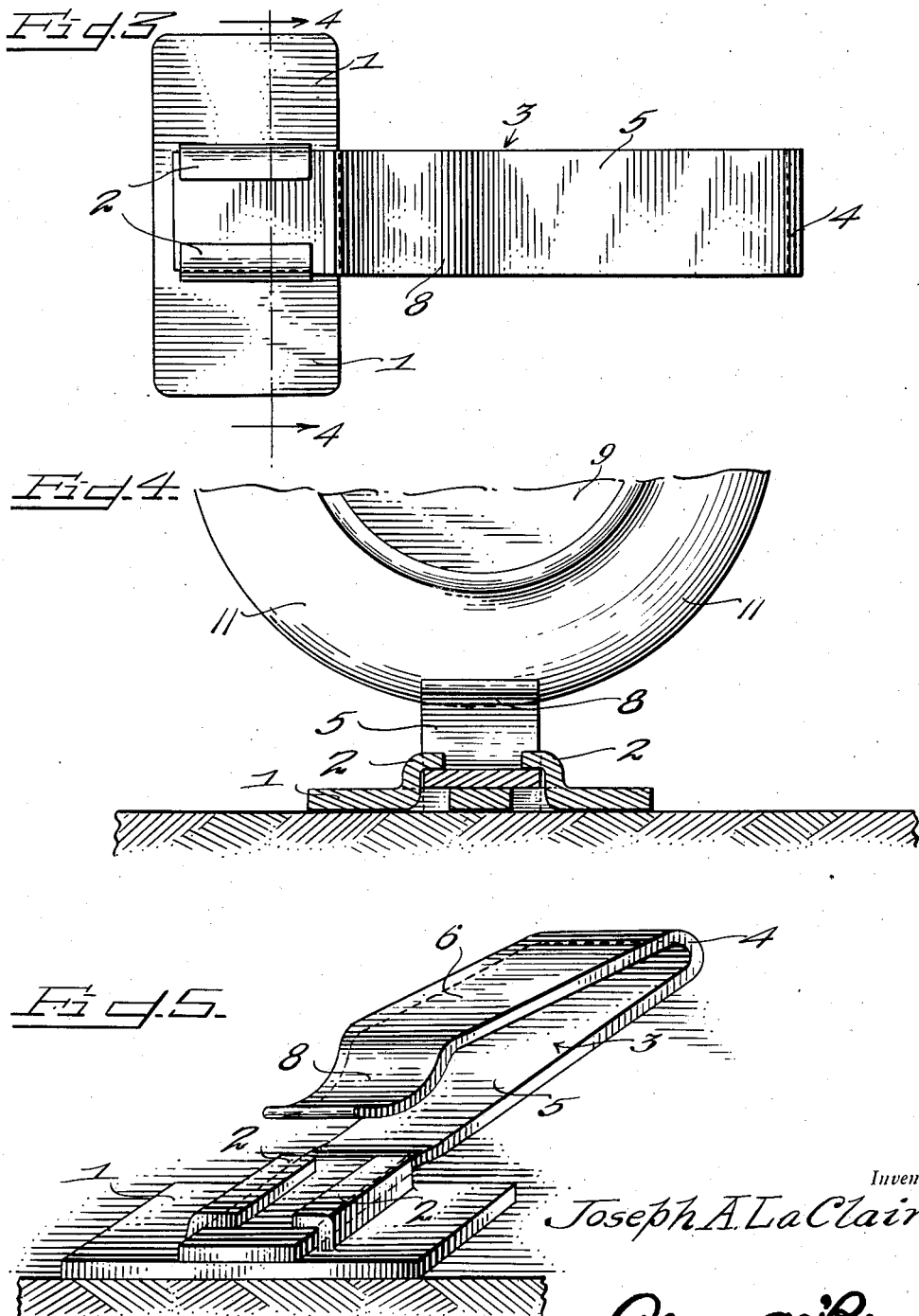
Inventor
Joseph A. LaClair.
By Clarence A. O'Brien
and Harvey B. Jacobson
Attorneys Patented May 18, 1948

2,441,638

UNITED STATES PATENT OFFICE 2,441,638

WHEEL SUPPORT

Joseph A. Laclair, Flat Rock, Mich.

Application April 30, 1946, Serial No. 666,143

3 Claims. (Cl. 254—1)

My invention relates to improvements in wheel supports for use in replacing tire equipped automobile wheels.

The primary object of my invention is to provide a simply constructed, inexpensive, readily portable device for supporting automobile wheels in elevated position off the ground for manipulation on to the usual wheel studs, so as to obviate lifting such wheels and thereby save time and labor.

To the accomplishment of the above, and subordinate objects presently appearing, a preferred embodiment of my invention has been illustrated in the accompanying drawings, set forth in detail in the succeeding description, and defined in the claims appended hereto.

In said drawings:

Figure 3 is a view in plan of the support drawn to an enlarged scale.

Figure 4 is a view in transverse section taken on the line 4—4 of Figure 3 and drawn to an enlarged scale with the wheel positioned on the support.

Figure 5 is a view in perspective of the support.

Figure 1:
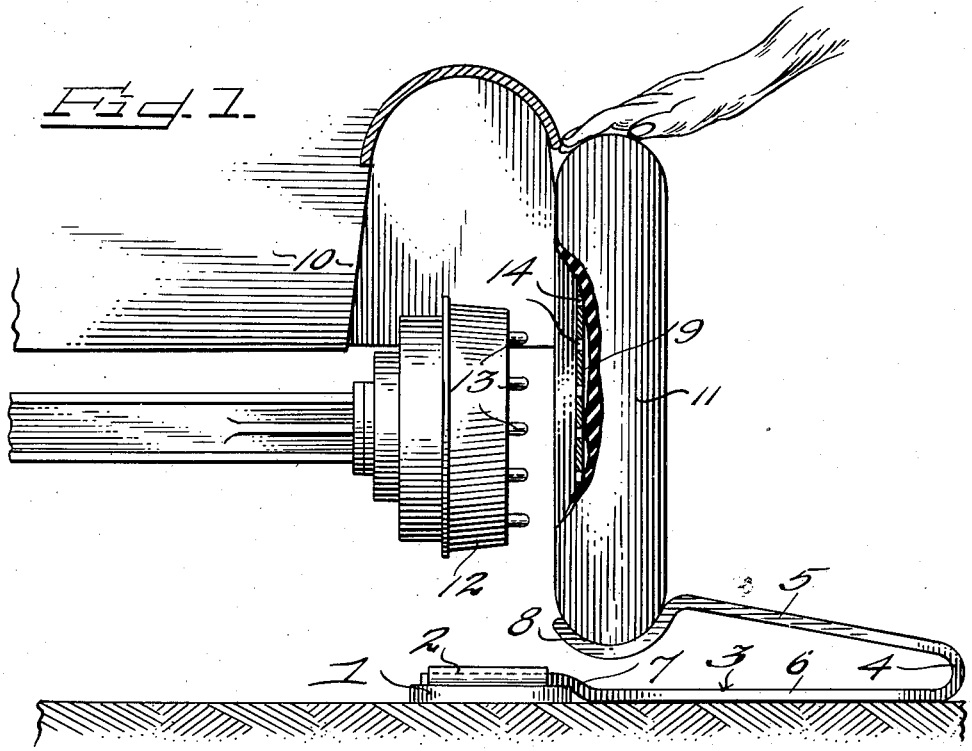
Figure 1 is a view illustrating my improved wheel support in side elevation, and the manner in which the same is used in replacing an automobile wheel.

Referring to the drawings by numerals, my improved wheel support, in the preferred illustrated embodiment thereof, comprises a plate-like base 1, of elongated rectangular shape, which may be formed of any inexpensive metal, and in any suitable size for convenient carrying, and is provided with a pair of laterally spaced keeper flanges 2 of right angled cross section struck up therefrom upon opposite sides of the transverse center thereof to extend crosswise of the same.

Figure 2:
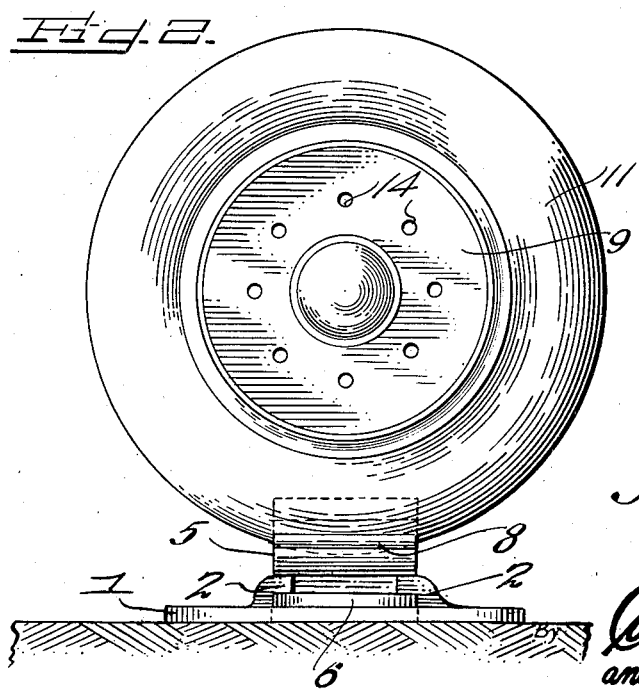
Figure 2 is a view in end elevation looking at the rear end of the support and at the rear side of the wheel.

The described base 1 forms a stabilizing member for a leaf spring member 3 formed from a resilient steel bar bent back upon itself intermediate the ends thereof, as at 4, to provide a lower leg 5 and a relatively shorter upper leg 6. The free end of the lower leg 5 is fitted tight in the keeper flanges 2 so that the remainder of said leg extends to one side of the base 1, and said leg 5 is bent, as at 7, to lie in the plane of the base 1, whereby said base 1 and leg 5 may be positioned flat on the ground. The upper leg 6 normally extends rearwardly from the bend 4 over the lower leg 5 in the general direction of the base 1 and terminates adjacent to said base in a concave, downwardly bent, free end 8 adapted to form a seat for the tire of an automobile wheel disposed crosswise thereof, as best shown in Figure 2. The leaf spring member 3 is sufficiently re-active to support the usual automobile tire and wheel elevated above the base 1 a distance slightly greater than that to which the wheel must be jacked up to clear the ground, or the floor of a garage.

A preferred use of the described wheel support will now be described. To replace, or remount, an automobile wheel 9, with the automobile 10 jacked up sufficiently for the wheel 9, in other words the tire 11, to clear the ground, for instance, and as shown in Figure 1, the wheel support is shoved along the ground toward the brake drum 12 to dispose the base 1 under said brake drum with the leaf spring member 3 extending from the base 1 outwardly of the outboard side of said brake drum 12 and with the free end 8 of said member positioned to support the wheel 9 alongside said brake drum 12 and just clear of the usual wheel mounting studs 13 on said drum. The upper leg 5 is then depressed, by foot pressure, the wheel 9 rolled on to said free end 8, by hand, and the foot pressure relieved so that said leg 5 is free to spring upwardly to elevate the wheel 9 and tire 11 slightly above proper position for mounting the usual apertures 14 in said wheel over said studs 13, all as shown in Figure 1. The support is then pushed further under the brake drum 12, while, at the same time, the upper leg 6 is depressed by manual pressure on the tire 11 to lower the wheel 9 sufficiently for manipulation of the same sidewise on to the studs 13. After the wheel 9 is completely replaced, it may be lowered and run off the support in a manner which will be clear.

The foregoing will, it is believed, suffice to impart a clear understanding of my invention without further explanation.

Manifestly, the invention, as described, is susceptible of modification without departing from the inventive concept, and right is herein reserved to such modifications as fall within the scope of the appended claims.

What I claim is:

1. A support for a wheel comprising a plate-like base adapted to rest flat on the ground, a leaf spring member extending from said base to one side thereof and embodying a lower ground engaging leg having an end attached to said base, and an upper depressible leg overlying the lower leg and provided with a terminal end seat onto which the wheel may be rolled when said upper leg is depressed, said upper leg being reactive upwardly to lift said wheel.

2. A support for a wheel comprising a plate-like base adapted to rest flat on the ground, a leaf spring member extending from said base to one side thereof and embodying a lower ground engaging leg having an end attached to said base, and an upper depressible leg overlying the lower leg and provided with a terminal end seat onto which the wheel may be rolled when said upper leg is depressed, said upper leg being reactive upwardly to lift said wheel, said base being provided with a pair of keeper flanges struck upwardly therefrom and in which said attached end of the ground engaging leg is fitted.

3. A support for a wheel comprising a plate-like base adapted to rest flat on the ground, a leaf spring member extending from said base to one side thereof and embodying a lower ground engaging leg having an end attached to said base, and an upper depressible leg overlying the lower leg and provided with a terminal end seat onto which the wheel may be rolled when said upper leg is depressed, said upper leg being reactive upwardly to lift said wheel, said base being provided with a pair of keeper flanges struck upwardly therefrom and in which said attached end of the ground engaging leg is fitted, said terminal end being bent downwardly of the upper leg and concave to form said seat.

JOSEPH A. LACLAIR.